April 21, 1970     H. DREYER     3,507,452
APPARATUS FOR DISTRIBUTING POWDERED AND GRANULAR
MATERIALS, INCLUDING FERTILIZERS
Original Filed May 19, 1966     3 Sheets-Sheet 1
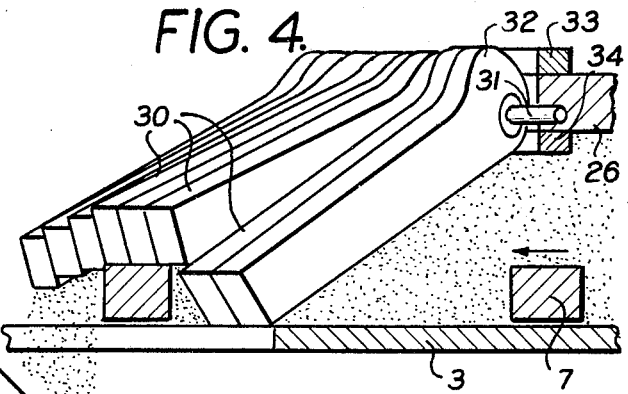
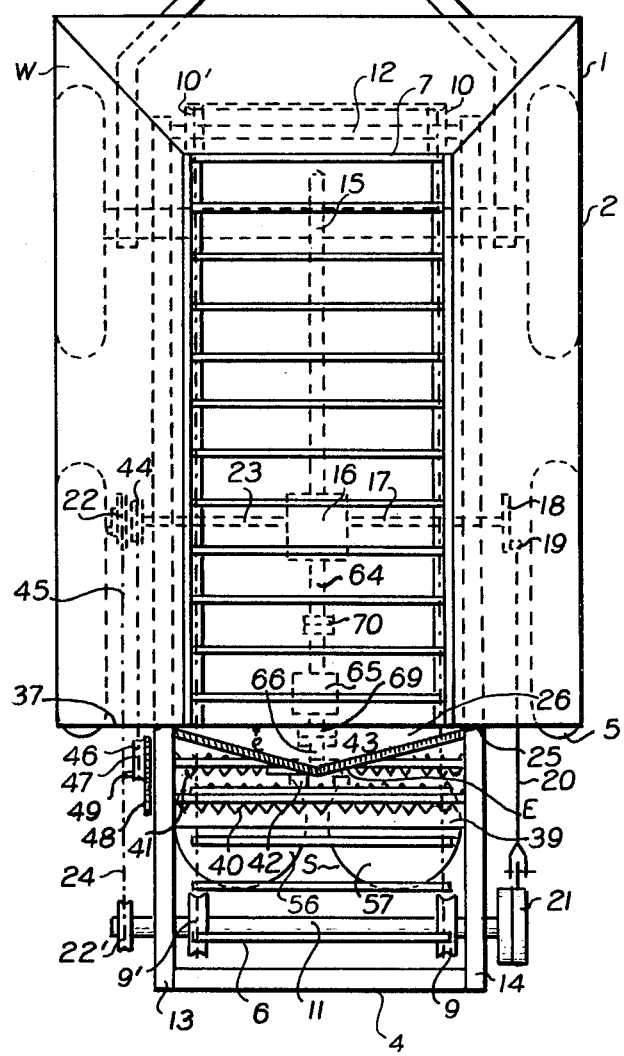
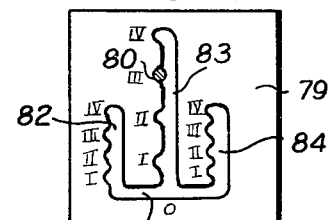
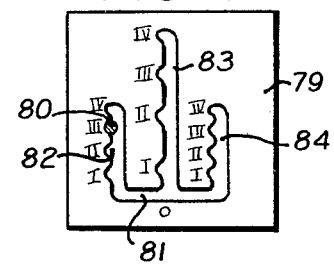
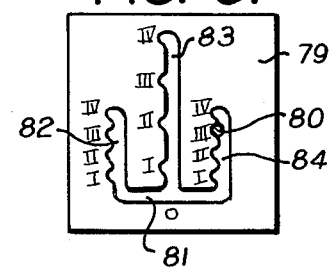
INVENTOR
HEINZ DREYER
BY
Burgess, Dinklage + Sprung
ATTORNEYS.

INVENTOR
HEINZ DREYER

April 21, 1970 H. DREYER 3,507,452
APPARATUS FOR DISTRIBUTING POWDERED AND GRANULAR
MATERIALS, INCLUDING FERTILIZERS
Original Filed May 19, 1966 3 Sheets-Sheet 3
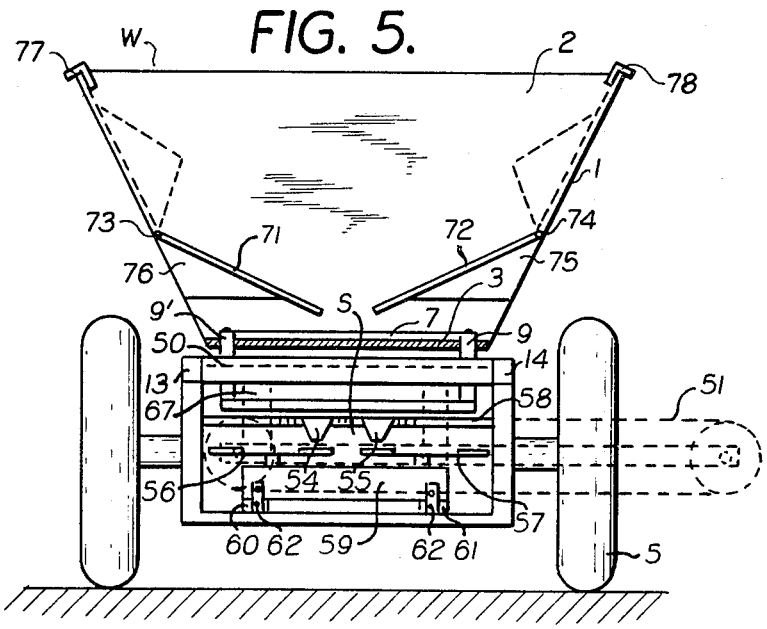
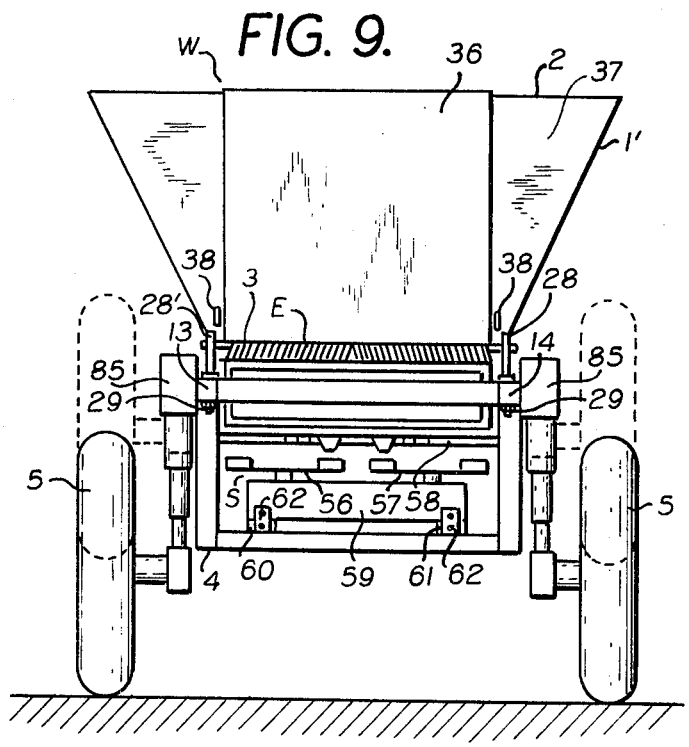
INVENTOR
HEINZ DREYER
BY
Burgess, Dinklage + Sprung
ATTORNEYS.

United States Patent Office 3,507,452
Patented Apr. 21, 1970

3,507,452
APPARATUS FOR DISTRIBUTING POWDERED AND GRANULAR MATERIALS, INCLUDING FERTILIZERS
Heinz Dreyer, Kreis Osnabruck, Germany, assignor to Amazonen-Werke H. Dreyer, Kreis Osnabruck, Germany
Continuation of application Ser. No. 551,416, May 19, 1966. This application Jan. 14, 1969, Ser. No. 792,224
Claims priority, application Germany, May 21, 1965
A 49,269
Int. Cl. A01c 19/00
U.S. Cl. 239—673        11 Claims

ABSTRACT OF THE DISCLOSURE

A centrifugal spreading apparatus, comprising a floor member having a rearwardly-positioned material-discharge edge and a rotating, recirculating, intermittently moving train of elongated scraper-bar members adapted to force material to and over the material-discharge edge, whereupon such falls upon rotating slinger disks.

---

This is a continuation of Ser. No. 551,416 filed May 19, 1966, now abandoned.

This invention relates in general to equipment for distributing powdered and granular materials over land surfaces, and more particularly to an apparatus adapted to travel over land surfaces carrying a supply of such materials and which is capable of scattering quantities of material at selectively controlled rates upon the land areas over and adjoining its path of movement.

The invention is susceptible of numerous potential material distribution applications, especially in the distribution of fertilizers, and can also be used for sowing seed and spreading sand, gravel and salt over icy road surfaces.

Essentially, the apparatus of the invention features a wagon having wheels, treads, or other conventional means to adapt it for traveling over the land surface upon which the materials are to be distributed. This wagon has side walls or other conventional means such as a hopper which is adapted to carry a supply of materials with a portion of the floor of the wagon being arranged to define a material discharge edge.

A conveyor means supported by the wagon for movement therewith is provided according to the invention for continuously carrying quantities of material past the material discharge edge for free fall therefrom onto a centrifugal spreader means also carried by the wagon and which centrifugally scatters the material and thus distributes it over the land surface as the wagon travels.

In general, the spreader means includes at least one member, preferably a disc or plate disposed for rotation relative to the wagon and positioned in underlying relation to the material discharge edge, which is expediently located at the rear of the wagon.

The conveyor means includes a continuous, recirculating train of elongated scraper bar members disposed for movement in a closed path extending along the length dimension of the wagon and arranged to pass along the wagon floor from the forward portion thereof to and past the material discharge edge which is inclined at a predetermined angle with respect to the direction of material conveyance. The wagon floor portion which defines the material discharge edge can be expediently constructed in a V-shaped form so as to have lateral portions both of which are inclined with respect to the direction of material conveyance thereby serving to regulate the rate at which the material is conveyed past the discharge edge.

One of the advantages to be attained by the use of a material discharge edge which is inclined at an angle to the direction of material conveyance as compared with a material discharge edge which extends straight across the direction of conveyance is that a relatively uniform material feed to the spreader can be achieved even where the scraper bars of the conveyor are moved in a cyclical intermittent fashion.

A further control over the feed rate of material to the spreader means can be realized by constructing the wagon with a rear wall having a lower edge disposed in spaced apart relation to the wagon floor to define therewith a slot for the passage therethrough of the scraper bars and materials conveyed thereby. In addition, this rear wall serves to aid in retaining the material supply within the wagon and can be connected to the wagon with conventional adjustable fastening means that will permit said rear wall to be positioned edgewise with respect to the wagon floor so as to accommodate adjustment of the material outfeed slot thus defined.

The essence of the invention resides in achieving, in a machine of the aforementioned type having a large capacity wagon body, an undisturbed feeding of the material onto a scattering or conveying means at a uniform rate per unit of time, and thereby satisfying the conditions prerequisite to a uniform further distribution of material. In general, the bottom scraper conveyor means and centrifugal spreader can be driven by power derived either from a motor, such as for example a gasoline engine, mounted on and carried by the wagon, or can be driven from the accessory power take-off of a tractor or other vehicle means which pulls the wagon. It should be noted that within the scope of the invention, the wagon can be either self-propelled, or can be connected to another vehicle for towing thereby.

According to German Patent 1,827,979, it is known in the prior art to hitch a centrifugal scattering device to the rear end of a manure spreader by means of hooks or clevis hitches, with the fertilizer being fed into such centrifugal scattering device by means of three conveying worms. Since the rear or material discharge edge of the spreader wagon floor in this particular design is a straight edge across the direction of conveyance, the cyclic advance of the bottom scraper will produce an intermittent, jerky feeding of material to the scattering means, which has been found to lead to serious irregularities in the spreading action. Furthermore, in this particular design, the material being spread is not dropped onto the spreading means until after the scraper bar turnover, a feature which causes portions of material to get between the pulleys and chains used for moving the scraper bars, thereby resulting in greater wear on these machine parts and an undesirable comminution of the particles being spread.

In the machine of this particular patent, the spreading rate is regulated by pivoting the rear wall of wagon vehicle. This system, while suitable for some applications, is not very satisfactory for applications wherein a high degree of material distribution uniformity is desired, because the inevitable jouncing of the wagon during its travel combined with the intermittent feeding of material to the scattering means results in a highly irregular spreading of the material. Also, in this machine, no means are provided for precisely metering the outflow of material being spread, nor is there any provision for automatically closing the material discharge opening in the rear wall of the wagon vehicle when the bottom scraper movement is halted. Also, the possibility of using the spreader vehicle as a transport for granular materials is not available, since in such particular apparatus, no suitable means are provided for rapidly emptying the wagon vehicle nor for guiding the flow of material from the wagon to accomodate emptying it.

It is furthermore known in the prior art, according to

German Patent 1,188,346, to hitch to a trailer equipped with a bottom scraper or rolling floor, a centrifugal spreader in which the fertilizer dropping intermittently into a hopper is regulated by a controlling device provided in the scattering apparatus, which influences through a linkage, the driving of the bottom scraper or rolling floor. This particular system of regulation is relatively expensive and complicated and is undoubtedly susceptible to practical difficulties.

In this prior art machine, there is also the disadvantage of dropping material onto the pulleys and chains of the bottom scraper drive system, and there is no provision made for automatically covering the wagon rear wall outlet opening when the bottom scraper is halted, so that such machine is not readily adaptable for use as a transporter as well as for a spreading machine.

According to the invention, material particles are prevented from becoming caught in the scraper bar conveyor mechanism by a structural arrangement whereby the recirculating chains or belts carrying the scraper bars are passed around turning pulleys located at a distance rearward of the material discharge edge.

The invention achieves a more uniform material distribution by at least partially angling the discharge edge of the wagon floor or the scraper bars in the horizontal plane in relation to the direction of material flow. In this manner, the material conveyed by the bottom scraper bars as they advance stepwise does not drop intermittently at each step onto the scattering device, but rather the fall of the material from the discharge edge is spread out over a relatively long period of time by the skewed shape of the wagon floor portion which defines the material discharge edge.

By making this floor portion V-shaped, upon each stroke of the bottom scraper, the material drop runs simultaneously from both sides of the discharge edge toward the centre or apex thereof. This results in a distribution of the flow of material onto the scattering device, which is located under the discharge edge, that is uniform over the entire breadth of said discharge edge.

If the spacing of the scraper bars corresponds to a distance no greater than the length or altitude of the V-shaped portion of the wagon floor that defines the two angled discharge edge portions, then, during operation, after a scraper bar has passed over the V-shaped portion of the wagon floor, the next bar will already have begun to drop the material over the angled edges. A greater spacing of the scraper bars would result in constant irregularities in the feeding of material to the scattering device.

The invention furthermore provides in such a manner that the dropping of the material takes place before the bottom scraper bars pass down over their turning end pulley or pulleys. This prevents any of the material from getting between the bottom scraper pulleys and the bottom scraper chains during operation thereby preventing the unnecessary loss of material and/or premature wear of the conveyor mechanism. This locating of the material drop edge ahead of the end of the bottom scraper offers the additional advantage in manufacture that, even in the case of a skewed arrangement of the rear edge of the wagon floor, the scraper bars can be made of rigid material and can be fastened in a very simple manner to the bottom scraper chains.

Furthermore, above the angled portions of the wagon floor, there is mounted a distributor head containing a large number of independently acting hold-back finger elements, which can be expendiently designed as hinged bars or as leaf springs.

The distributor head simultaneously serves several functional purposes. First, the individual hold-back elements prevent the material from flowing out until a scraper bar lifts the individual hold-back elements thereby opening the way for the issue of material. After each scraper bar passes through, the individual hold-back elements close independently of one another by spring action or by their own weight, and prevent the material from continuing to flow uncontrolled. Furthermore, when the bottom scraper movement is stopped, as for example while material is being transported, the distributor head seals off the material flow outlet. If the apparatus of the invention is used, for example, as a fertilizer spreader, there is no need to actuate a shut-off slide or the like when turning at the end of a field.

In one particularly advantageous embodiment of the invention, the individual hold-back elements consist of pivoting bars which have stopping projections at their upper end. When the scraper bars pass through, these projections stop the pivoting bars by encountering a stop bar, and are thereby prevented from stalling in the upraised position or from flipping over backwards.

In order to achieve a rapid and free outfeed of material so as to empty the wagon, as for example when the machine is used as a grain transport wagon, provision is made according to the invention so that the distributor head is mounted pivotally on the wagon and can be locked in an upraised position. This makes it possible to pivot the distributor head up out of its working position so as to enable rapid emptying of the wagon. To enable the spreader apparatus to be also used exclusively as a transport, the distributor head is removably mounted to the wagon.

For the further equalization of the material being advanced stepwise, a trough is disposed beneath the angled rear portion of the wagon floor, i.e. discharge edge portion, and within this trough at least one conveyor screw is mounted athwart the line of movement, one half of this conveyor screw having a right-handed thread and the other half having a left-handed thread. In this manner, the material being advanced stepwise, although it is already spread out over a certain dropping period by the angled discharge edge arrangement, is conveyed by the screw or screws to the middle of the trough thereby resulting in an additional equalization and hence in a constant rate of feed to the spreading device.

According to the invention, a greater width of spread area coverage is made possible by controllably increasing the rotational speed of the centrifugal spreader elements, which is particularly advantageous in the case of granular fertilizers. This is accomplished by controlling the rotary speed of two slinger discs which are mounted beneath outlet openings of the trough, so that the apparatus can be adjusted for an optimum spread for each type of fertilizer or granular material to be distributed.

With this arrangement of the spreading mechanism, the trough contains in its bottom, two outlet openings which can be opened or closed selectively from the tractor pulling the wagon, independently of one another in order to make possible a unilateral material spreading at the edges of fields.

Although these outlet openings have to be opened or closed, the overall rate of material flow is controlled only by the bottom scraper speed of movement. For this reason, the invention provides that the bottom scraper is driven through a worm drive and a continuously variable speed transmission. In this manner, the rate of material feed per unit of time can be adjusted very precisely.

Furthermore, the invention provides that the bottom scraper can be driven directly by the worm drive. This makes possible a rapid emptying of the wagon, which is advantageous, for example in the transportation of grain.

Since in the case of unilateral spreading, if one trough outlet opening were closed without simultaneously reducing the bottom scraper feed rate, the apparatus would spread out twice the amount of material per unit area, and this potential problem is remedied by regulating the bottom scraper material feed speed in conjunction with the closing of the trough outlet openings via an interconnected or coupled control means which can be operated from the towing tractor by means of a lever.

With such an arrangement, the adjustment of the lever is made in accordance with distinctive markings or detent positions on a control panel, so that when one trough outlet opening is closed, the speed of the bottom scraper is reduced to one half of its speed when both outlet openings are uncovered.

Since in machines of this construction, the amount of power required to drive the bottom scraper is relatively high on account of the pressure of the material within the wagon acting against the bottom scraper, thus rendering its drive parts highly subject to wear, the invention provides that, to reduce the drive power for certain types of materials, such as grain or granular fertilizers, cover plates are mounted on the interior of the side walls on the wagon, these cover plates extending lengthwise with the wagon side walls and are provided with support members by means of which they rest against the wagon side walls. These cover plates substantially reduce the pressure of the material on the bottom scraper. On the other hand, in the case of moist types of fertilizers, the use of such cover plates would result in a bridging of material across and over the scraper bars so that after a short period of operation, the scraper bar train would cut a free tunnel through the material supply contained within the wagon thereby preventing further feeding of material to the centrifugal spreader. To prevent such bridging, the cover plates are mounted pivotally and removably to the wagon side walls and are arranged so as to be able to be pivoted into an upraised position and locked there.

The invention furthermore contemplates a material distributing apparatus wherein the elevation distance or spacing between the wagon floor and the centrifugal spreader slinger discs and/or the ground can be made continuously variable by means of jacking devices, such as for example, hydraulic cylinders. Such wagon floor elevation control capability has numerous advantages one being that when the machine is used as a fertilizer spreader, the raising of the wagon floor together with the slinger discs results in a greater width of spread which is particularly advantageous in the case of spreading a top dressing. Also, the wagon floor can be lowered to a convenient position for loading, and for unloading it can be raised for convenience in discharging the wagon into a receiving conveyance or hopper.

The material distributing apparatus of the invention also features a rear wall on the wagon which is adjustable. This makes it possible first to close the outlet slot between the bottom scraper and the rear wall as becomes necessary when the apparatus is used as a grain transport wagon. In such applications, it is better to fold up or remove the distributor head which otherwise is the only means that stops material flow through the outlet slot. With an adjustable rear wall, the wagon outlet slot can be opened still wider for convenience in cleaning.

In order to be able to deflect the flow of the material during the unloading process, when the apparatus is used as a grain transport wagon, the trough can be closed off by means of a guide plate.

It is therefore, an object of the invention to provide an apparatus for distributing powdered and granular materials, and particularly fertilizers.

Another object of the invention is to provide an apparatus as aforesaid which is capable of carrying a supply of such materials to be distributed, and selectively initiating and terminating the distribution of controlled quantities of materials taken from said supply.

A further object of the invention is to provide an apparatus as aforesaid which can be utilized as a transport vehicle for such materials.

A further object of the invention is to provide an apparatus as aforesaid including means for centrifugally scattering such materials at selected rates as it passes over the land area upon which the materials are to be distributed.

A further object of the invention is to provide an apparatus as aforesaid having self-contained means for conveying controlled dosage quantities of such materials to its centrifugal scattering means for ultimate distribution thereby.

A further object of the invention is to provide an apparatus as aforesaid wherein the conveying of materials to the scattering means and the distribution of materials thereby is accomplished substantially without any further comminution of said materials.

A further object of the invention is to provide an apparatus as aforesaid wherein a uniform distribution of such materials can be achieved with an intermittent motion type conveyor means which feeds materials to the centrifugal scattering means.

Other further objects and advantages of the invention will become apparent from the following detailed description and accompanying drawings in which:

FIG. 1 is a plan view of a material distributing apparatus according to a preferred embodiment of the invention.

FIG. 4 is a detail view of the material distribution head provided in the apparatus of FIGS. 1–3.

FIG. 5 is an elevation view, partly in section, of the apparatus of FIGS. 1–4, as viewed looking towards the front portion thereof.

FIG. 6 is a detail view of a control panel provided in the apparatus of the invention for regulating the material distribution rate and area coverage thereof, as illustrated in a typical operating configuration.

FIG. 7 is another detail view of the control panel of FIG. 6 as illustrated in another typical operating configuration.

FIG. 8 is a further detail view of the control panel of FIG. 6 as illustrated in still another typical operating configuration.

FIG. 9 is a rear elevation view of a material distributing apparatus according to another embodiment of the invention, featuring means for adjustably varying the above-ground height of the wagon to accommodate the loading thereof, and to regulate the material distribution area coverage of said apparatus.

Figure 2:
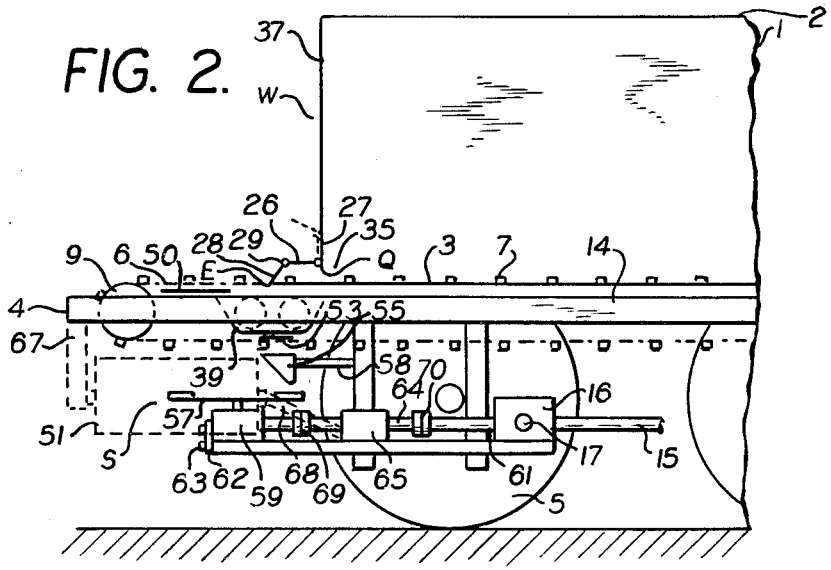
FIG. 2 is a partial side elevation view of the material distributing apparatus of FIG. 1, showing the rear portion thereof.
Figure 3:
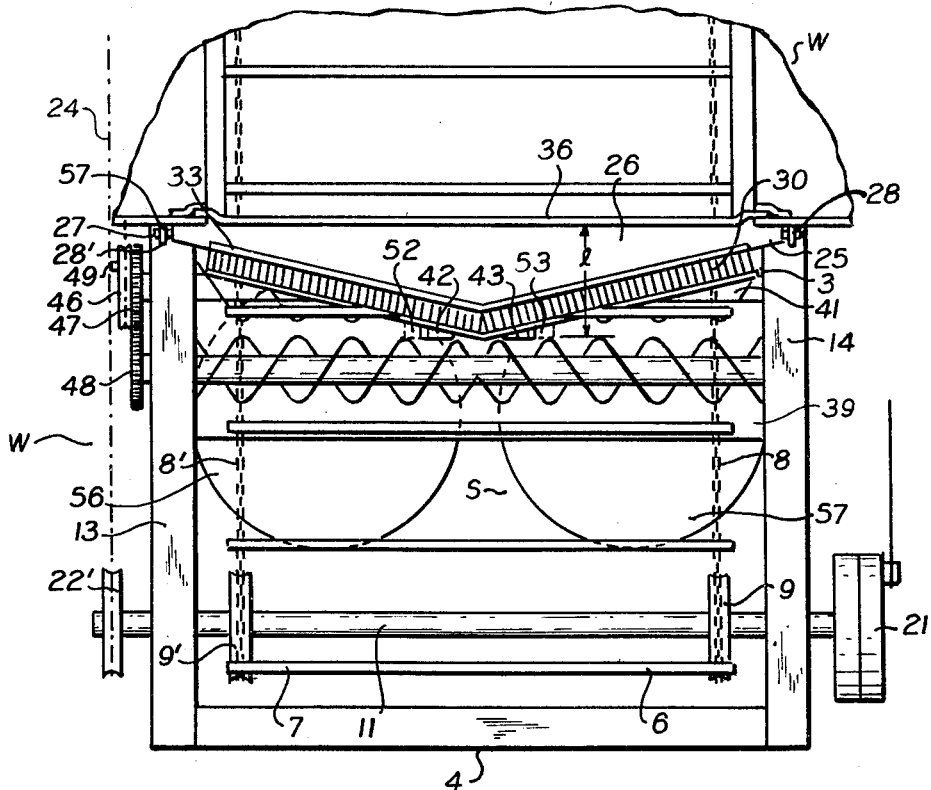
FIG. 3 is a plan view of the rear portion of the apparatus of FIG. 2 illustrating the general arrangement of the conveyor means, centrifugal spreader and automatic closing material distribution head thereof.

Referring now to FIGS. 1, 2 and 3, the material distributing apparatus 1 includes a wagon W having a chassis frame 4 with wheels 5 mounted thereto for traveling over land surfaces. The wagon W features a hopper 2 having a generally horizontal platform floor 3 which extends lengthwise with the wagon W. The hopper 2 enables the wagon W to carry a supply of granular materials (not shown), in particular, fertilizers, either for distribution upon land areas adjoining the movement path of the wagon W as it travels, or for transportation to a remote location for delivery thereat.

Along the lengthwise dimension of the wagon floor 3, runs an endless bottom scraper type conveyor 6 having a plurality of scraper bars 7 spaced apart from one another and fastened to each of two drive chains 8 and 8'. These drive chains 8 and 8' also extend lengthwise with the wagon W and are generally parallel to each other and are guided over corresponding sets of terminal pulleys 9, 9' and 10, 10'. The terminal pulleys 9, 9' and 10, 10' are fastened to shafts 11 and 12, respectively, which in turn are mounted in frame members 13 and 14 that extend longitudinally rearward of the hopper tube.

Essentially, the bottom scraper conveyor 6 serves for conveying quantities of granular material between its scraper bars 7 along the floor 3 past the rear portion thereof which defines a material discharge edge E, for free fall therefrom onto a centrifugal spreader S which scatters it as the wagon W travels. The scraper bars 7 and drive chains 8, 8' of the conveyor 6 define a continuous, or endless, ladder-like train of scraper bars 7 which recirculates in a closed path established by the location of the pulleys 9, 9' and 10, 10', and the upper flight portion of which passes along the length of the wagon floor 3 from the forward portion thereof to and past the material discharge edge E at the rear portion thereof.

The bottom scraper conveyor 6 is expediently driven by rotary power applied to the shaft 11 so as to turn pulleys 9, 9'. This rotary power can be conveniently supplied by the mechanical power take-off of an agricultural tractor or engine (not shown) via the combination of a shaft 15 coupled thereto and to a worm drive 16, and another shaft 17 coupled to the worm drive 16 and to a crank wheel 18. The crank wheel 18, through a crank pin 19 and rocking arm 20 drives a roller clutch 21, whereby the bottom scraper bar train of the conveyor 6 is driven stepwise a certain distance by each stroke of the rocker arm 20. This distance and hence the length of the conveyor 6 advancing step can be continuously varied by conventional means, such as for example, by adjusting the displacement of the crank pin 19 on crank wheel 18.

In order to be able to drive the bottom scraper conveyor 6 directly from the worm drive 16 without transmitting power through the step drive elements, i.e. crank wheel 18, crank pin 19, rocker arm 20 and roller clutch 21, the invention provides for driving the shaft 11 directly from the worm drive 16, so as to bypass the step drive elements. For this purpose, a sprocket 22 is provided which can be selectively coupled to a shaft 23 by means of a pin (not shown) or other disengageable coupling means, with said shaft 23 being coupled to an additional mechanical output element such as a gear (not shown) of the worm drive 16. Another sprocket 22' mounted on shaft 11 and coupled to the sprocket 22 by an endless chain 24 serves for transmitting rotary power from shaft 23 to shaft 11 to drive the conveyor 6 directly from the worm drive 16, as is most advantageous where the hopper 2 of apparatus 1 is to be emptied rapidly, as for example, when said apparatus 1 is used as a transporter.

The granular material within the hopper 2 is carried between the successive scraper bars 7 of conveyor 6 and is discharged from the rear edge E of the wagon floor 3, said rear floor portion being constructed generally V-shaped to provide a material discharge edge E which is also V-shaped in plan form and which is covered by a distributing head 25 that is also V-shaped in plan form.

The distributor head 25 has a support plate 26 which is mounted on lugs 28 and 28' on frame members 13 and 14 so as to be pivotable about a horizontal shaft 27 and removable therefrom as desired. Lugs 28 and 28' are fastened to the members 13 and 14 of chassis frame 4 by means of bolts 29.

Along the two inclined edges of plate 26 which run together to form a V, a plurality of individual finger bars 30 are disposed and pivotally connected to a shaft 31 mounted to said plate for support thereby. These bars 30 normally lie, under their own weight, with their bottom face ends in contact with the material discharge edge E of the wagon floor 3, and inclined at an elevation angle of approximately 45° with respect thereto. Each bar 30 has a projection 32 which acts as a limit stop when the bar 30 is swung upward by contacting a stop bar 33 also mounted on plate 26, as better seen in detail from FIG. 4. Another stop bar 34 similarly arranged in the manner of stop bar 33, limits the downward pivoting of the bars 30.

As is clearly shown in FIG. 4, during operation of the conveyor 6, the bars 30 are lifted successively by the individual scraper bars 7 passing underneath said bars 30 and along the floor 3 on their way past the edge E, and after the passage of each scraper bar 7, said bars 30 pivot back, of their own weight, into contact with the wagon floor discharge edge E, thereby blocking the free flow of materials from the hopper 2. In the absence of the sealing effect provided by these finger bars 30, such free flow of materials from the hopper 2 would ordinarily occur through the outlet slot 35 thereof beneath the central portion 36 of the rear wall 37 of said hopper 2, and which is defined by the spacing between the lower edge Q of said central wall portion 36 is so arranged and connected to the rear wall 37 as to be displaceable vertically with respect to the wagon floor 3, for purposes of adjusting the effective opening of the outlet slot 35. To accommodate the rapid emptying of the hopper 2, the wall portion 36 is raised to its upper limit position, whereas to seal off the hopper 2, independently of the sealing action provided by the distributor head 25, said wall portion 36 can be lowered until its lower edge Q contacts the wagon floor 3 thereby diminishing the effective outlet slot 35 area until the hopper 2 is sealed.

Toggles 38 mounted on the rear wall 37 of hopper 2 serve to secure the distributor head 25 in an upraised position as when it is pivoted upward from the discharge edge E, thereby rendering it ineffective to control material flow through the outlet slot 35, as in the case where the wagon W is to be emptied quickly.

Underneath the distributing head 25, a trough 39 is mounted between the upper and lower flight sections of the conveyor 6, said trough 39 being arranged to capture material pushed off the discharge edge E by the scraper bars 7 of conveyor 6. Two worm members 40 and 41, are disposed within the trough 39 for rotation relative thereto for conveying material captured in said trough 39 to two outlet openings 42 and 43 in the bottom thereof. The worms 40 and 41 are mounted on the frame members 13 and 14 and are driven by a sprocket 44, which is mounted on a shaft 23, through a chain 45, another sprocket 46 and the two gears 47 and 48. A pin 49 serves to couple the sprocket 46 to gear 47. Half of each of the worms 40 and 41 has a right-handed spiral thread, and the other half thereof has a left-handed spiral thread, whereby the material captured in the trough 39 will always be driven towards the center of said trough 39 to the two outlet openings 42 and 43.

Should it be desired to distribute the materials conveyed out of the hopper 2 by means other than the centrifugal spreader S, such as for example, by means of a transverse conveyor type spreader 51 (shown in phantom) mounted underneath the hopper outfeed conveyor 6 to the frame members 13 and 14, a guide plate 50 can be provided to cover the trough 39 and guide the flow of materials to such spreader 51.

The trough 39 outlet openings 42 and 43 can each be covered either fully or partially, independently of one another, by slide members 52 and 53 which are operated from the towing tractor by a conventional control linkage (not shown).

A pair of funnels 54 and 55 are mounted displaceably upon a rail 58 and thereby supported from the chassis frame 4 to guide material from the trough outlets 42 and 43 onto selected radial positions on the rotating slinger discs 56 and 57 of the centrifugal spreader S.

These slinger discs 56 and 57 are driven through a transmission 59 coupled to any suitable conventional motor means (not shown) either carried by the wagon W or provided on the towing tractor (not shown). The transmission 59 is mounted upon support members 60 and 61 of the chassis frame 4 by means of lugs 62 and bolts 63, and is driven through the combination of a shaft 64 coupled to it, a variable speed transmission 65 and another shaft 66 which is coupled to the motor means (not shown).

The variable speed transmission 65 serves for the adjustment of the rotation speed of the slinger discs 56 and 57.

After removing the transmission 59 along with the slinger discs 56 and 57, the transverse conveyor type spreader 51 can be installed on fastening lugs 67, and can then be driven through a universal shaft 68 by the variable speed transmission 65.

A clutch 69 serves to disconnect the drive to the two slinger discs 56 and 57 and the variable speed transmission 65 can be disengaged from driving operation by a clutch 70.

In the case of granular material which does not tend to bridge, in order to limit to a minimum the pressure of such material on the bottom scraper conveyor 6 and hence the power required for driving same, cover plates 71 and 72 are disposed pivotally about their connection axes 73 and 74 on the side walls of the hopper 2, resting by means of support members 75 and 76 against the hopper walls.

In the case of moist material or powder having a strong tendency to bridge, the cover plates 71 and 72 can be folded up and secured to the hopper walls by means of hooks 77 and 78.

FIGS. 6, 7 and 8 illustrate a typical detent type control panel 79 for the simultaneous regulation of the bottom scraper feed conveyor 6 and the material flow control slides 52 and 53, either one of which can be closed to effect a unilateral spreading of material as the wagon W travels. By swinging a lever 80 laterally in the horizontal slot 81 of panel 79, the flow control slides 52 and 53 are operated by a conventional mechanical, hydraulic or electrical linkage (not shown), while the perpendicular movement of the lever 80 in slots 82, 83 and 84 of panel 79 serves to regulate the speed of operation of the bottom scraper conveyor 6.

As shown in FIG. 6, the lever 80 is detained in slot 83 at a position designated as III. This position corresponds to an operating condition wherein both flow control slides 52 and 53 are open and the bottom scraper speed is set at a certain rate. In FIG. 7, the leftward shifting of the lever 80 has closed the flow control slide 53, and the setting of said lever 80 in position III in slot 82 has reduced the speed of the bottom scraper conveyor 6 to one half its normal rate when both flow control slides 52 and 53 are open, thus resulting in a unilateral spreading leftward at a constant quantity of material per unit of area covered. FIG. 8 shows the corresponding setting of lever 80 in the case of a unilateral material spreading to the right of the wagon W. In the case of such unilateral spreading action, it is therefore possible by switching lever 80 from the central slot 83 into either the left spreading slot 82 or the right spreading slot 84 and positioning said lever to same III detent to obtain automatically an identical quantity of material distributed per unit of area. For example, when the lever 80 is set at any detent position I–IV in the central slot 83, a bilateral spreading of material occurs at a rate dependent upon the value of the Roman numeral detent setting of said lever, and to effect a unilateral spreading at the same rate, it is merely necessary to shift the lever 80 into the appropriate slot 82 or 84 and position it at the same Roman numeral detent.

As illustrated in FIG. 9, the spreading apparatus 1' is provided with hydraulic cylinders 85 each attached to the chassis frame 4 and to the axle of an associated wheel 5 for the purpose of raising and lowering the wagon W to a selected position. This particular feature is advantageous in that it permits the wagon W to be lowered for convenient loading of its hopper 2, and to be raised for achieving a wider material spreading coverage with any given speed of slinger disc 56 and 57 rotation.

From the foregoing description of typical embodiments of the invention, it will be appreciated by the artisan that the material distributing apparatus according to the invention is susceptible of numerous modifications and variations all within the spirit of the invention.

I claim:

1. Apparatus for distributing granular materials over a surface comprising means adapted to carry such materials across said surface; said carrying means having a floor containing a rearwardly positioned material-discharge edge inclined at a predetermined angle with respect to the direction of conveyance of material, thereby regulating the discharge rate of said material; conveyor means including a recirculating train of elongated scraper bar members spaced along the length of the conveyor means and extending transversely thereof disposed for intermittent movement along a closed path extending along the length dimension of said carrying means, which bar members pass along the upper surface of said floor from a forward portion thereof to and past said material-discharge edge and then return underneath said floor; centrifugal spreader means, operatively associated with said carrying means, including rotatable means positioned below said material-discharge edge and adapted to centrifugally scatter material falling from said edge; a rear wall operatively connected to said carrying means, which wall serves to retain said material on said floor, said rear wall having a lower edge disposed in spaced relation to said floor whereby defining a slot adapted to receive the passage of said scraper bars therethrough; rotatable guide means operatively connected across said slot positioned to contact said floor in one position and then to seal said slot against passage of material therethrough and rotatable to uncover said slot and thus permit passage of said scraper bars therethrough; and intermittent motion-drive means operatively associated to said train of scraper bars adapted to cause said scraper bars to intermittently impact against said material in a sequential, stepwise recirculatory movement relative to the wagon floor.

2. The apparatus claimed in claim 1, wherein said guide means includes a plurality of finger members, each disposed for pivotal movement in a generally vertical plane, whereby to contact said floor in one position and thus to seal said slot and to pivot upwardly out of contact with said floor, whereby to uncover said slot and thereby permitting the passage of said scraper bars therethrough, said finger members being disposed inside by said adjoining relationship across the length of said slot with each of said fingers adapted for independent engagement with said scraper bars and independent pivotal movement, which distributing head is operatively connected to said rear wall.

3. The apparatus according to claim 1 including drive means operatively connected to said train of scraper bars to impart recirculatory movement thereto for conveying materials from said hopper past the material discharge edge into said trough, and speed control means operatively connected to said drive means and responsive to said controllable closure means to regulate the movement, speed and hence the material delivery rate of said scraper bar train to said trough in accordance with the number of trough outlets open to effect an approximately constant distribution of materials per unit area under unilateral as well as bilateral scattering operation.

4. The apparatus according to claim 3, wherein said centrifugal scattering means is adjustable in height and removably mounted on said wagon.

5. The apparatus claimed in claim 3, wherein said rotatable means includes two substantially horizontal discs, each rotatable in the same plane in the opposite direction, wherein said apparatus includes a basin disposed in underlying relation to said material-discharge edge adapted to capture material falling therefrom and disposed above said disk members, with two bottom outlets therein positioned to accommodate the free fall therethrough of material onto said disk members; and wherein said apparatus further contains a worm member disposed within said basin for rotation relative thereto, whereby being adapted to convey the material in said basin toward said outlet.

6. Apparatus as claimed in claim 5 wherein said worm member is partially righthanded and partially lefthanded.

7. The apparatus according to claim 1, wherein said wagon floor portion defines a V-shaped material discharge edge, the lateral portions of which are inclined with respect to the direction of material conveyance of said conveyor means, and wherein the scraper bars of said conveyor means are spaced apart from one another in the direction of their movement path by a maximum distance corresponding to the altitude of the triangular floor portion defined by said inclined lateral edge portions and a line joining their outer extremities, whereby as one scraper bar passes over the apex of said V-shaped material discharge edge, the following scraper bar will be at least passing onto said triangular floor portion to assure continuity of material discharge from the V-shaped edge thereof.

8. The apparatus according to claim 2, wherein each of said finger members has a projecting stop portion disposed for contact with a stop member fixedly positioned with relation to said rear wall to limit the upward pivotal displacement of said finger member.

9. The apparatus according to claim 2 including a spring means operatively connected to each finger member to urge same into said normal position of contact with the wagon floor for slot section sealing action.

10. The apparatus according to claim 2, wherein said distributing head means is pivotally connected to said rear wall and disposed for pivotal movement into an upward position out of contact with the wagon floor to uncover said slot, and including locking means disposed for securing said distributing head means in said upward position.

11. The apparatus according to claim 2, wherein said distributing head means is releasably connected to said rear wall to accommodate the selective removal and attachment of the distributing head means thereto.

References Cited

UNITED STATES PATENTS

| | | |
|---|---|---|
| 104,992 | 7/1870 | Painter. |
| 575,375 | 1/1897 | Reilly. |
| 1,038,814 | 9/1912 | Alexander. |
| 1,776,814 | 9/1930 | Lutz. |
| 1,868,337 | 7/1932 | Storm. |
| 3,329,436 | 7/1967 | Fyrk. |

M. HENSON WOOD, Jr., Primary Examiner

M. Y. MAR, Assistant Examiner

U.S. Cl. X.R.
239—676, 679, 682